United States Patent
Volkov (10) Patent No.: US 12,294,607 B2
(45) Date of Patent: May 6, 2025

(54) METHOD AND SYSTEM FOR DETERMINING AN AUTOMATED INCIDENT RESPONSE (71) Applicant: F.A.C.C.T. NETWORK SECURITY LLC, Moscow (RU)

(72) Inventor: Dmitry Aleksandrovich Volkov, Moscow (RU)

(73) Assignee: F.A.C.C.T. NETWORK SECURITY LLC, Moscow (RU)

( * ) Notice: Subject to any disclaimer, the term of this patent is extended or adjusted under 35 U.S.C. 154(b) by 347 days.

(21) Appl. No.: 17/579,297

(22) Filed: Jan. 19, 2022

(65) Prior Publication Data
US 2022/0159034 A1 May 19, 2022

Related U.S. Application Data (63) Continuation of application No. PCT/RU2020/000165, filed on Mar. 27, 2020.

(30) Foreign Application Priority Data
Mar. 25, 2020 (RU) ................................ 2020112223

(51) Int. Cl.
H04L 9/40 (2022.01)
(52) U.S. Cl.
CPC ...... H04L 63/1441 (2013.01); H04L 63/1416 (2013.01); H04L 63/1433 (2013.01)
(58) Field of Classification Search
CPC ............. H04L 63/1441; H04L 63/1416; H04L 63/1433; H04L 41/0816; G06F 21/53;
(Continued)

(56) References Cited

U.S. PATENT DOCUMENTS 8,776,241 B2 7/2014 Zaitsev
8,819,772 B2 * 8/2014 Bettini ................ H04L 63/1433
709/227

(Continued)

FOREIGN PATENT DOCUMENTS

RU 2610395 C1 2/2017

OTHER PUBLICATIONS

Analysis of security data from a large computing organization, Sharma et al, Jun. 2011 (Year: 2011).*

(Continued)

Primary Examiner — Jahangir Kabir
(74) Attorney, Agent, or Firm — BCF LLP (57) ABSTRACT A method and a system of responding to a cybersecurity incident are disclosed. The method comprises: receiving incident data of at least one incident from a given computer system; analyzing the incident data of the at least one incident, including determining whether the at least one incident has been prevented before; in response to determining that the at least one incident has not been prevented yet in the given computer system, determining, based on the incident data, a threat severity of the at least one incident; and in response to the threat severity of the at least one incident exceeding a predetermined threat severity threshold, determining, based on the incident data, one or more responses to the at least one incident for responding thereto in the given computer system.

19 Claims, 4 Drawing Sheets (58) Field of Classification Search
CPC .... G06F 21/554; G06F 21/566; G06F 21/552; G06F 21/56
See application file for complete search history.

(56) References Cited

U.S. PATENT DOCUMENTS

| | | |
|---|---|---|
| 8,856,927 B1 | 10/2014 | Beloussov et al. |
| 11,176,276 B1* | 11/2021 | Chen .................... H04L 63/1433 |
| 2005/0182950 A1* | 8/2005 | Son ..................... H04L 63/1416 |
| | | 713/189 |
| 2009/0044024 A1 | 2/2009 | Oberheide et al. |
| 2011/0078797 A1* | 3/2011 | Beachem ............ H04L 63/1441 |
| | | 726/25 |
| 2013/0055399 A1 | 2/2013 | Zaitsev |
| 2014/0201836 A1 | 7/2014 | Amsler |
| 2015/0365438 A1 | 12/2015 | Carver et al. |
| 2016/0164919 A1 | 6/2016 | Satish et al. |
| 2017/0220801 A1* | 8/2017 | Stockdale ............. G06F 21/552 |
| 2020/0057953 A1* | 2/2020 | Livny ................... G06F 21/554 |

OTHER PUBLICATIONS

Search Report with regard to the RU Patent Application No. 2020112223 completed Sep. 8, 2020.
International Search Report and Written Opinion with regard to PCT/RU2020/000165 mailed Dec. 17, 2020.

* cited by examiner

ND SYSTEM FOR
DETERMINING AN AUTOMATED INCIDENT
RESPONSE

CROSS-REFERENCE

The present application is a continuation of International Patent Application No.: PCT/RU2020/000165, entitled "METHOD AND SYSTEM FOR MAKING A DECISION OF AUTOMATED INCIDENT RESPONSE," filed on Mar. 27, 2020, the entirety of which is incorporated herein by reference.

FIELD

The present technology broadly relates to the field of cybersecurity; and in particular, to methods and systems for determining an automated incident response.

BACKGROUND

Certain prior art approaches are directed to generating responses to cybersecurity incidents in computer systems.

Russian Patent No.: 2,610,395-C1, issued on Feb. 9, 2017, assigned to AO "InfoTeKC", and entitled "METHOD OF COMPUTER SECURITY DISTRIBUTED EVENTS INVESTIGATION", discloses a method of downloading data on system events from all user computers to a security server, registering at least one of these system events caused security incident. The downloaded events are analyzed by searching among them such events which are similar to the events preceding already registered security incident. There is carried out a correlation analysis of data on time-phased and place-phased events using additional rules including the following actions: specifying background conditions and analysis depth level, forming initial rule set for correlation analysis, selecting significant rules into the effective rule set, detecting and eliminating conflicts among the selected rules, checking the correspondence of actual analysis depth for each rule from the effective rule set, searching and applying the solutions to eliminate effects and prevent security incident. Security incident report is formed.

U.S. Pat. No. 8,776,241-B2, issued on Jul. 8, 2014, assigned to Kaspersky Lab AO, and entitled "AUTOMATIC ANALYSIS OF SECURITY RELATED INCIDENTS IN COMPUTER NETWORKS", discloses solutions for responding to security-related incidents in a computer network, including a security server, and a client-side arrangement. The security server includes an event collection module communicatively coupled to the computer network, an event analysis module operatively coupled to the event collection module, and a solution module operatively coupled to the event analysis module. The event collection module is configured to obtain incident-related information that includes event-level information from at least one client computer of the plurality of client computers, the incident-related information being associated with at least a first incident which was detected by that at least one client computer and provided to the event collection module in response to that detection. The event analysis module is configured to reconstruct at least one chain of events causally related to the first incident and indicative of a root cause of the first incident based on the incident-related information. The solution module is configured to formulate at least one recommendation for use by the at least one client computer, the at least one recommendation being based on the at least one chain of events, and including corrective/preventive action particularized for responding to the first incident.

SUMMARY

It is an object of the present technology to ameliorate at least some of the inconveniencies of the prior art.

Unlike the prior art approaches referenced above, non-limiting embodiments of the present technology are directed to incident detection in the response system itself. According to at least non-limiting embodiments of the present technology, the incident detection signal is transmitted to the automated response system together with threat properties using external threat search systems. Besides, the non-limiting embodiments of the present technology allow determining, whether the detected threat has been prevented yet or not, and if it is determined that the threat has been not prevented, one or more predetermined response are determined based at least one a threat severity of the threat.

More specifically, in accordance with a first broad aspect of the present technology, there is provided a computer-implemented method of responding to a cybersecurity incident in a given computer system. The method is executable by a processor communicatively coupled to the given computer system. The method comprises: receiving, by the processor, incident data of at least one incident targeting the given computer system, the incident data comprising at least one of: an incident category of the at least one incident, a threat severity of the at least one incident, one of a name and an address of a host of the given computer system where the at least one incident has been detected, and a detection confidence level associated with the at least one incident; analyzing, by the processor, the incident data of the at least one incident, including determining whether the at least one incident has been prevented before; in response to: (i) determining that the at least one incident has not been prevented yet in the given computer system; and (ii) the threat severity of the at least one incident exceeding a predetermined threat severity threshold, determining, by the processor, based on the incident data, one or more responses to the at least one incident for responding thereto in the given computer system.

In some implementations of the method, the incident category comprises at least one of three predetermined incident categories.

In some implementations of the method, if the incident category of the at least one incident is a first predetermined incident category, the one or more responses to the at least one incident comprises ending a malicious process associated with the at least one incident and isolating the host where the at least one incident has been detected.

In some implementations of the method, if the incident category of the at least one incident is a second predetermined incident category, the analyzing includes determining a user account under which the at least one incident has been detected, and if the user account is not a privileged user account, the privileged account enabling one of installation and modification of one of an information system and a device in the given computer system, the one or more responses to the at least one incident comprises blocking the user account.

In some implementations of the method, if the user account is the privileged user account, the analyzing includes comparing the detection confidence level associated with the at least one incident to a predetermined confidence level threshold, and in response to the detection confidence level being below the predetermined confidence level threshold, the one or more responses comprises blocking the user account.

In some implementations of the method, the blocking the user account, being the privileged user account, is executed if a number of blocked privileged user accounts for a predetermined time is less than a threshold number of user accounts.

In some implementations of the method, if the incident category of the at least one incident is a third predetermined incident category, the analyzing includes determining a process having caused the at least one incident, and determining whether a host operating system of the host where the at least one incident has been detected is a server operating system.

In some implementations of the method, if the at least one incident has been caused by a system process and the host operating system is a server operating system, the one or more responses to the at least one incident comprises coping a content of a random-access memory of the host.

In some implementations of the method, wherein the copying the content of the random-access memory is executed if less than a threshold number of responses have been done for a predetermined time.

In some implementations of the method, if the at least one incident has been caused by a non-system process and the host operating system is a server operating system, the one or more responses to the at least one incident comprises coping the content of the random-access memory of the host and ending the non-system process.

In some implementations of the method, the copying the content of the random-access memory and ending the non-system process are executed if less than a threshold number of responses have been done for a predetermined time.

In some implementations of the method, if the host operating system is not a server operating system, the one or more responses to the at least one incident comprises isolating, within the given computer system, the host where the at least one incident has been detected.

In some implementations of the method, the isolating the host is executed if less than a threshold number of hosts have been isolated for a predetermined time.

In some implementations of the method, the one or more responses are for the responding to the at least one incident in the given computer system at one of a file level, a host level and a network level.

In some implementations of the method, the responding at the file level comprises at least one of:
  blocking at least one malicious file and quarantining it;
  sending at least one malicious file to an isolated environment for analysis;
  searching for at least other one malicious file associated with the at least one malicious file on at least one host, and deleting the at least other one malicious file; and
  ending a malicious process.

In some implementations of the method, wherein the responding at the host level comprises at least one of:
  collecting incident information of the at least one incident at the host;
  copying a content of a random-access memory of the host;
  sector-based copying of a nonvolatile memory of the host;
  isolating the host from a network of the given computer system; and
  blocking execution of any applications except for original programs developed by a manufacturer of a host operating system of the host.

In some implementations of the method, the incident information comprises at least one of: data on programs automatically loaded at starting the host operating system, Prefetch files, running processes, system event logs, content of temporary directories.

In some implementations of the method, the responding at the network level comprises at least one of:
  blocking a user account;
  running incident handling script files; and
  sending a report.

In accordance with a second broad aspect of the present technology, there is provided a system for responding to a cybersecurity incident in a given computer system. The system comprises: a processor communicatively coupled to a given computer system, and non-transitory computer-readable memory storing instructions. The processor, upon execution the instructions, is configured to: receive incident data of at least one incident targeting the given computer system, the incident data comprising at least one of: an incident category of the at least one incident, a threat severity of the at least one incident, one of a name and an address of a host of the given computer system where the at least one incident has been detected, and a detection confidence level associated with the at least one incident; analyze the incident data of the at least one incident, including determining whether the at least one incident has been prevented before; in response to: (i) determining that the at least one incident has not been prevented yet in the given computer system; and (ii) the threat severity of the at least one incident exceeding a predetermined threat severity threshold, determine, based on the incident data, one or more responses to the at least one incident for responding thereto in the given computer system.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Implementation of the technique will be further described in accordance with the attached drawings, which are presented to clarify the technique chief matter and by no means limit the field of the technique. The following drawings are attached to the application.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

According to certain non-limiting embodiments of the present technology, the present method of determining the automated incident response may be part of an extended multicomponent system. For example, in some non-limiting embodiments of the present technology, the present method may be executed as part of at least one of: an antivirus program, isolated environment (sandbox), malware detonation platform, have a connection to an emergency response center (CERT), etc. These and other functional components or subsystems not being part of the automated incident response system described hereinbelow in the present specification are referred to as "external computer systems". It should be understood that they act in concert with the described systems and methods, but such external computer systems and components do not form a part thereof.

Figure 1:
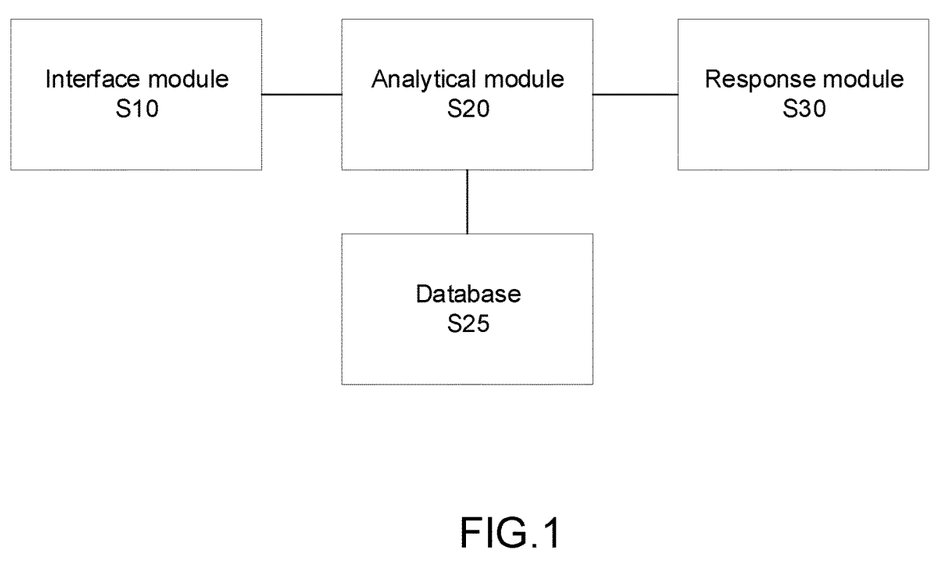
FIG. 1 depicts a schematic diagram of a system for determining an automated incident response that can be used for implementing at least some non-limiting embodiments of the present technology.

With initial reference to FIG. 1, there is depicted a schematic diagram of a system configurable to determine the automated incident response to a given cybersecurity incident, in accordance with certain non-limiting embodiments of the present technology. As it can be appreciated from FIG. 1, the system can comprise an interface module S10 configured to receive incident detection signals indicative of given cybersecurity incident from external computer systems; an analytical module S20 configured to determine conditions and select methods of automated incident response, and also to access a database S25 of the system enabling to obtain data from it and store data in it; and a response module S30 configured to execute a given automated response when implementing the present method, in at least some non-limiting embodiments thereof.

It should be expressly understood that each one of the interface module S10, the analytical module S20, and the response module S30 can be implemented as a separate electronic device, such as a hardware server or a personal computer. Thus, according to certain non-limiting embodiments of the present technology, each one of the interface module S10, the analytical module S20, and the response module S30, for execution functions thereof, may include all or some of components of a computing environment 400 further including a processor 401, described below with reference to FIG. 4. However, in other non-limiting embodiments of the present technology, functions of each one of the interface module S10, the analytical module S20, and the response module S30 can be executed by a single electronic device.

Figure 2:
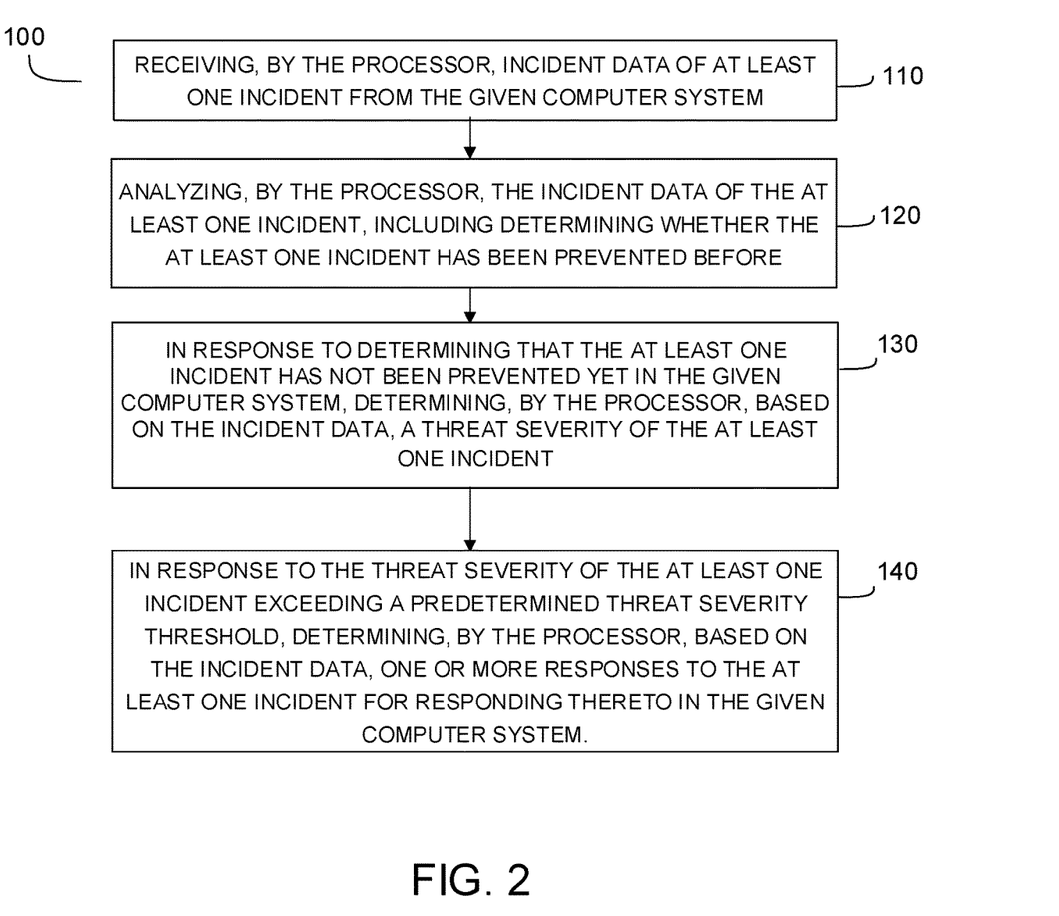
FIG. 2 depicts a flowchart diagram of a method of determining the automated incident response to a cybersecurity incident, in accordance with certain non-limiting embodiments of the present technology.

With reference to FIG. 2, there is depicted a flowchart diagram of a method 100 for determining the automated incident response to the given cybersecurity incident, in accordance with certain non-limiting embodiments of the present technology. The method 100 can be executed, for example, by the processor 401 of the computing environment 400.

According to certain non-limiting embodiments of the present technology, the processor 401 can be configured to determine a respective automated incident response in response to receiving data of the given cyber security incident. As noted above, it should be understood that, according to certain non-limiting embodiments of the present technology, search and detection of the given cyber security incident (or otherwise a cybersecurity threat) are executed by external computer systems, which do not comprise part of the present system for determining the automated incident response. When the given cyber security incident has been detected, incident data indicative thereof can further be transmitted, by the external computer systems, to the system described with reference to FIG. 1 above, and the processor 401 of one of the modules thereof, such as the interface module S10, can be configured to receive this data. Further, based on the incident data, the processor 401 can be configured to determine the automated incident response for further use in responding to the given cybersecurity incident, as will described immediately below.

Step 110: Receiving, by the Processor, Incident Data of at Least One Incident from the Given Computer System The method 100 commences at step 110 with the processor 401 being configured to receive the incident data of the given cybersecurity incident. According to certain non-limiting embodiments of the present technology, the incident data can comprise at least one of following features.

Threat Category (Category). The threat category of the given cybersecurity incident indicates what type of incident has been detected, including, for example, whether the given cybersecurity incident is associated with running a specific type of malware, such as ransomware, worm, trojan, and others; lateral movement; indications of an advanced persistent threat (APT), etc.

Threat Severity (Severity). Generally speaking, the threat severity of the given cybersecurity incident can depend on the threat category associated therewith. For example, if the given cybersecurity incident associated with activity of adware has been detected, the threat severity can be determined as being low. At the same time, if the given cybersecurity incident includes ransomware or worm, the threat severity of the given cybersecurity incident can be determined as being high.

In some non-limiting embodiments of the present technology, the threat severity can be determined by an external computer system which has detected the given cybersecurity treat, for example, by a malware detonation platform thereof known as TDS Polygon, or by an isolated environment, such as a sandbox. In one example, the threat severity of the given cybersecurity incident can be expressed by a binary value, such as 0 or 1, for example, which is indicative of whether the threat severity is low or high, respectively. In another example, the treat severity can include a categorical value, such as critical, high, medium, or low, and others.

Detection Confidence Level (Confidence). According to certain non-limiting embodiments of the present technology, the detection confidence level associated with the given cybersecurity incident is a numerical indicator indicative of a reliability level of the external computer system having detected the given cybersecurity incident. More specifically, the detection confidence level can be indicative of the detecting the given cybersecurity incident has not resulted from a false-positive response of the external computer system.

Name or address of a host where the given cybersecurity incident has occurred and/or has been detected. In the context of the present specification, a host denotes a network node. Thus, a given hosts could include, for example, one of physical devices, such as computers, servers, laptops, smartphones, tablets, game consoles, TV sets, printers, network hubs, switches, routers, unspecified devices combined by IoT (Internet of Things), etc. In another example, the given host can also include one of hardware-software solutions enabling to arrange several network nodes at one physical device, such as so-called virtual hosts Apache, etc.

In additional non-limiting embodiments of the present technology, the incident data can include additional information, for example, without limitation, a file name and checksum of malware which is associated with the given cybersecurity incident, at least one of an IP address and a domain name of an external web server, to which at least one request has been sent from the external computer system to be protected, name of an account record from where lateral movement in the external computer system to be protected has been observed, etc.

The method 100 thus advances to step 120.

Step 120: Analyzing, by the Processor, the Incident Data of the at Least One Incident, Including Determining Whether the at Least One Incident has been Prevented Before Further, at step 120, the processor 401 can be configured to analyze the incident data to determine whether the given cybersecurity incident has been prevented before in the external computer system where it has been detected or not (see step 121 in FIG. 3). By executing the step 120, the processor 401 can be configured to determine if the given cybersecurity incident is associated with an actual cybersecurity incident and if further automated incident response needs to be determined. For example, in cases where the given cybersecurity incident has been detected in response to a piece of malware having been running in a sandbox, or in other isolated environment, or a malicious file was blocked before having been detected again—the processor 401 can be configured to stop processing the incident data indicative of the given cybersecurity incident to generate the automated incident response for responding thereto.

For example, in some non-limiting embodiments of the present technology, the processor 401 can be configured to determine whether the given cybersecurity incident carries the actual threat by checking the incident data thereof against the database (S25 in FIG. 1). The database S25 comprises data on all hosts being part of the network where the described system is running, and also on all response procedures executed by the system within a given time period, for example, for a past day.

In one example, if the name or address of the host of the external computer system, where he given cybersecurity incident has occurred and/or has been detected, is the same as one of the names or addresses of the hosts, where sandboxes, malware detonation systems and similar isolated environments are located, it is considered that the given cybersecurity incident has been already prevented; and the processor 401 can be configured to stop analyzing the incident data associated with the given cybersecurity incident without determining the automated incident response thereto.

In another example, if the file name or checksum of malware associated with the given cybersecurity incident are the same as those of pieces of malwares already blocked by the system at this host during one of response procedures executed within a given time period, it is considered that the given cybersecurity incident has been already prevented; and the processor 401 can thus be configured not to determine the automated incident response thereto.

In yet another example, if the incident data associated with the given cybersecurity incident does not include a malware file name or checksum, for example, when the given cybersecurity incident is associated with lateral movement, or a request to an external IP address (being in the list of malicious addresses) or indications of APT signs, the incident is considered as not being prevented, and the processor 401 can further be configured to determine the automated incident response thereto.

In additional non-limiting embodiments of the present technology, the processor 401 can also be configured to determine the automated incident response to the given cybersecurity incident if it has been determined that the given cybersecurity incident has been detected and/or occurred at a host of the external computer system that is not a sandbox, or when a past response to the given piece of malware having invoked the given cybersecurity incident has not been recorded in the database S25.

The method 100 hence advances to step 130.

Step 130: In Response to Determining that the at Least One Incident has not been Prevented Yet in the Given Computer System, Determining, by the Processor, Based on the Incident Data, A Threat Severity of the at Least One Incident At step 130, in response to determining that the given cybersecurity incident has not been prevented yet in the external computer system where it has been detected, the processor 401 can be configured to determine if the threat severity of the given cybersecurity incident exceeds a predetermined threat severity threshold.

Thus, in response to the threat severity of the given cybersecurity incident being lower than or equal to the predetermined threat severity threshold, the processor 401 can be configured to stop analyzing the incident data associated with the given cybersecurity incident without determining the automated incident response thereto.

However, in response to the threat severity of the given cybersecurity incident exceeding the predetermined threat severity threshold, the processor 401 can be configured to proceed to step 140 for determining the automated incident response thereto.

Step 140: In Response to the Threat Severity of the at Least One Incident Exceeding a Predetermined Threat Severity Threshold, Determining, by the Processor, Based on the Incident Data, One or More Responses to the at Least One Incident for Responding Thereto in the Given Computer System According to certain non-limiting embodiments of the present non-limiting, at step 140, the processor 401 can be configured to determine the automated incident response to the given cybersecurity incident based on the incident data associated therewith.

Figure 3:
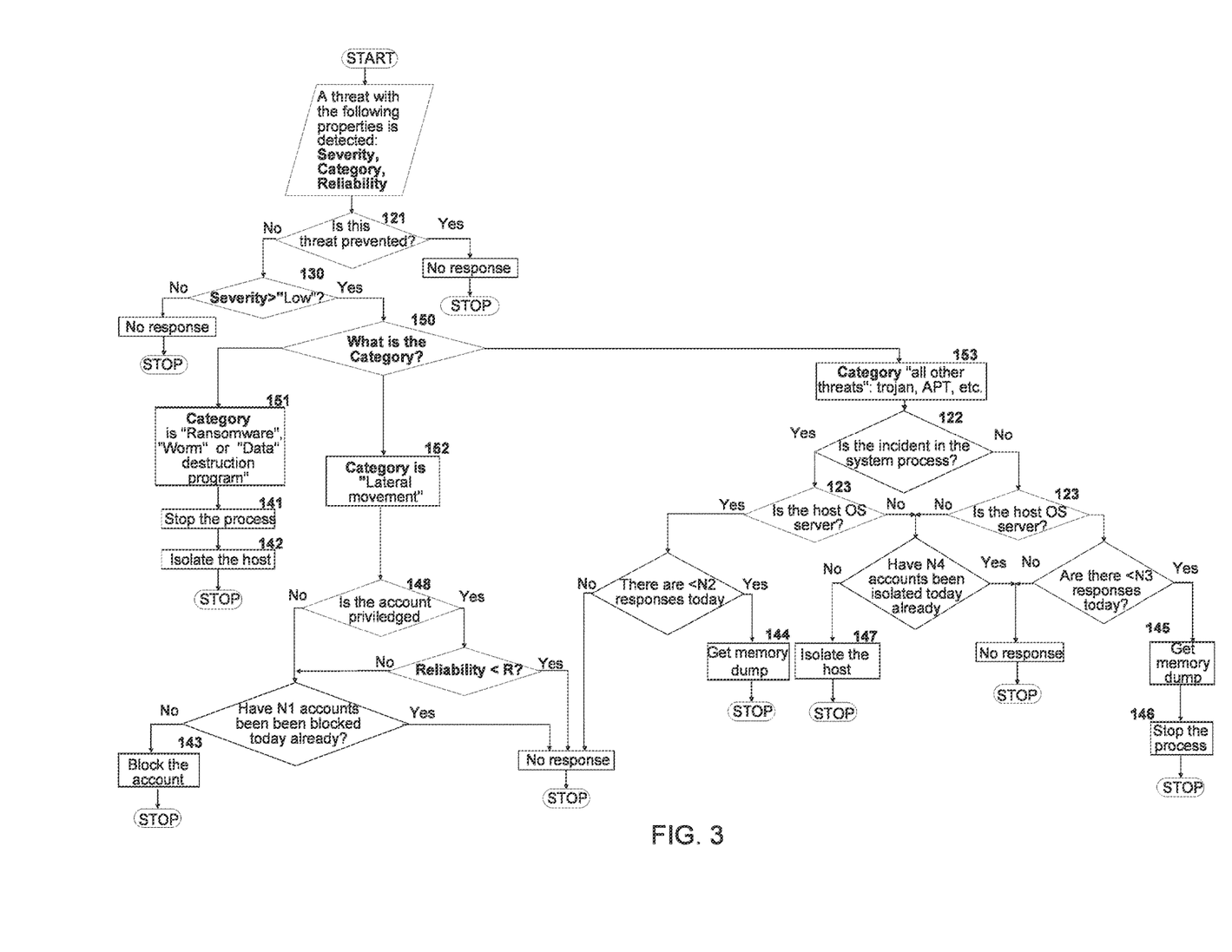
FIG. 3 depicts a flowchart diagram of an example process for determining the automated incident response the cybersecurity incident based on incident data associated therewith, in accordance with certain non-limiting embodiments of the present technology.

With reference to FIG. 3, there is depicted a flowchart diagram of an example process for determining, by the processor 401, the automated incident response to the given cybersecurity incident, in accordance with certain non-limiting embodiments of the present technology.

It should be understood that the process of FIG. 3 is provided herein as an example of implementing certain non-limiting embodiments of the present technology and in no way should be considered limiting. More specifically, a number of possible responses from which that the processor 401 can be configured to select one for responding to the given cybersecurity incident can be more or less than those depicted in the flowchart diagram of FIG. 3. For example, in some non-limiting embodiments of the present technology, although differently depicted in FIG. 3, incidents of a "trojan distribution" type and incidents of an "APT" type could belong to two different threat categories. Similarly, incidents of "worm distribution", "running of data destruction program" and "ransomware running" types could belong to three respective different threat categories, etc.

In another example, incidents of "trojan distribution" category and incidents of "worm distribution" category could be placed under a single threat category and not in different categories as in the example below.

According to certain non-limiting embodiments of the present technology, the processor 401 can be configured determine the automated incident response to the given cybersecurity incident as being at one of following levels:
a file level;
a host level; and
a corporate network level.

According to certain non-limiting embodiments of the present technology, at the file level, the automated incident response can include at least one of:
blocking and quarantining a malicious file associated with the given cybersecurity incident;
sending the malicious file to an isolated environment (sandbox of any known type or malware detonation platform of any known type, e.g. TDS Polygon) for dynamic analysis;
searching for original and child malicious files (such as copies of the former) associated with the given cybersecurity incident on all hosts of the external computer system, and deleting them; and
stopping a malicious process associated with the given cybersecurity incident.

According to certain non-limiting embodiments of the present technology, at the hist level, the automated incident response can include at least one:
collecting the incident information required for investigations. Incident information comprises at least data on startup programs, Prefetch files, running processes, system event logs, content of temporary directories;
copying content of a random-access memory (memory dump) of the host where the given cybersecurity incident has been detected;
sector-based copying of nonvolatile memory (e.g. HDD, SSD, etc.) of the host;
isolating the host from the network of the external computer system; and
blocking start of any applications except for original programs developed by a manufacturer of an operating system run on the host.

Further, according to certain non-limiting embodiments of the present technology, at the corporate network level, the automated incident response can include at least one:
blocking the user account associated with the given cybersecurity incident at the domain level; and
running incident handling script files; for example, adding malicious mail servers associated with the given cybersecurity incident to the block list or blocking IP addresses of malware management servers associated with the given cybersecurity incident at a firewall level.

Thus, the automated incident response can be executed at different levels depending on a type of the given cybersecurity incident, its properties, and also effectiveness of taking specific measures. Thus, in certain non-limiting embodiments of the present technology, the processor 401 can be configured to determine the automated incident response as including some or all the measures non-exhaustively listed above.

Thus, to determine the automated incident response, first, the processor 401 can be configured to determine the threat category of the given cybersecurity incident. By way of example, the processor 401 can be configured to determine the threat category as being one of a first threat category, a second threat category, and a third threat category.

The first threat category (151), within the scope of this example, can include incidents caused by the following threat types, but not limited to: ransomware, worms, data destruction programs.

The second threat category (152), within the scope of this example, can include incidents related to lateral movement.

The third threat category (153), within the scope of this example, can include all the other incidents not related to the first or second threat category, e.g. trojan, APT, etc.

According to the flowchart diagram of FIG. 3, if the given cybersecurity incident is of the first threat category (151), the processor 401 can be configured to determine the automated incident response as being stopping the malicious process at the file level (141), then isolating the host at the host level (142).

Further, the processor 401 can be configured to transmit data indicative of the automated incident response to the external computer system having been compromised by the given cybersecurity incident for responding thereto.

The method 100 hence terminates.

A First Example of Determining the Automated Incident Response

Let it be assumed that one of the employees of a company, a computer network of which is being protected by system described herein above with reference to FIG. 1 and configured to implement the method 100, receives from a domain administrator, whose account has been compromised, an e-mail with an attachment and text prompting to review the attached document as soon as possible. The employee opens the attached document which may thus pose a first cybersecurity incident to their computer (that is, a host of the computer network of the company) including, for example, executing a malware of the worm threat category, thereby causing spread thereof in the computer network of the company.

As mentioned above, at least one of the external computer systems may be configured to continuously search for cybersecurity incidents. When worm distribution is detected, the external computer system generates and transmits the incident data of the worm to the system implementing the method 100, and based on the incident data, the processor 401 can thus be configured to determine a respective automated incident response to the first cybersecurity incident, as described above.

The incident data of the first cybersecurity incident, that is, the worm, may have the following properties:
Threat Severity (Severity): critical;
Threat Category (Category): worm;
Reliability Level (Reliability): 99%;
Network segment of the computer system where the computer, in which the cybersecurity incident has been detected, is located: segment name;
Workgroup \ domain which it belongs to: domain name \ workgroup name;
Whose working place (position) this host is: an employee's computer.

Such incident data can be received by other hosts of the computer network of the company as they can be also infected by the worm before responding thereto at the network level. Actions of the described system will be similar in response to receiving such incident data from each host of the computer network.

In accordance with the flowchart diagram of FIG. 3, at step 121, the processor 401 can be configured to determine that the first cybersecurity incident has not been prevented yet in the computer system and the host where it has been detected is not the sandbox. Further, at step 130, the processor 401 can be configured to determine the threat severity of the first cybersecurity incident, that is the worm, which, in the present example, the processor 401 can be configured to determine as being high. Further, as the threat severity of the first cybersecurity incident may thus exceed the predetermined threat severity threshold being at a low level, for example, at step 150, the processor 401 can be configured to determine and cause execution of the respective automated incident response to the first cybersecurity incident.

Since the threat category is "worm", the processor 401 can be configured to determine the respective automated incident response corresponding to the first threat category (151).

At step 141, at the file level, the processor 401 can thus be configured to determine the respective automated incident response for responding to this worm including following actions:
blocking and quarantining the malicious file;
the malicious file associated with the activity of the worm could be additionally sent for the dynamic analysis (it depends on whether this kind of worm is known);
searching for original and child malicious files at all computers of the computer system, and deleting them;
stopping the malicious process associated with the worm.

Further, at step 142, at the host level, the processor 401 can be configured to cause execution of following actions:
isolating the host where the worm has been detected from the network (to stop worm distribution);
collection of necessary evidences. An archive comprising the information required for operational research (data on startup programs, Prefetch files, running processes, system event logs, content of temporary directories, etc.) could be created at this step for investigation of malware penetration technique.

If the worm does not carry any additional load, i.e. other malwares distributed together therewith (let it be assumed that it does not), the processor 401 can be configured skip copying the content of the random-access memory and execute sector-based copying of nonvolatile memory of that host where the worm has been detected.

Further, the processor 401 can be configured to generate a report on response results and further send the report to entities in charge of the cybersecurity of the computer network at the corporate network level. Thus, the processor 401 can be configured to determine the respective automated incident response to the first cybersecurity incident, that is, the worm.

However, with continued reference to FIG. 3, if the processor 401 has determined, based on the incident data, that the first cybersecurity incident is of the second threat category (152), the processor 401 can be configured to identify a user account under which the first cybersecurity incident has been detected and/or occurred. Further, if the processor 401 has determined that the user account is not a privileged one (148), and a number of blocked privileged user accounts for a predetermined time (such as an hour, a day, or a week, as an example) is less than an $N_1$ predetermined threshold number, the processor 401 can be configured to determine the respective automated incident response to the first cybersecurity incident as being blocking the user account associated with detecting/occurring of the first cybersecurity incident (143) at the corporate network level, which corresponds to step 140 of the method 100 as described above.

As it can be appreciated, if the number of blocked privileged user accounts does not exceed the $N_1$ predetermined threshold number during the predetermined time, the processor 401 can be configured to stop analyzing the incident data associated with the first cybersecurity incident without determining the respective automated incident response thereto.

In the context of the present specification, a privileged user account of a given computer system denotes a user account entitling a respective user thereof to install, modify, and/or manage some information system or device in the given computer system. In the corporate IT infrastructure, a privileged user account could be possessed, for example, by system administrators, application administrators, administrators of databases, cloud services, web sites, and also to managers of some departments, safety department, cyber security department, etc.

In some non-limiting embodiments of the present technology, if the first cybersecurity incident originates from the privileged user account, the processor 401 can further be configured to compare the detection confidence level associated with the first cybersecurity incident (Confidence) (148) to a predetermined confidence level threshold (e.g. 80%). Further, if the processor 401 has determined that the detection confidence level is below the predetermined confidence level threshold, and also if the number of blocked privileged user accounts for the predetermined time is less than the $N_1$ predetermined threshold number, the processor 401 can be configured to determine the respective automated incident response as blocking the privileged user account (143) at the corporate network level, in accordance with step 140 of the method 100 described above. However, if the number of blocked privileged user accounts for predetermined time exceeds the $N_1$ predetermined threshold number, the processor 401 can be configured to cease to analyze the incident data associated with the first cybersecurity incident without determining the respective automated incident response thereto.

Further, according to certain non-limiting embodiments of the present technology, if the processor 401 has determined, based on the incident data, that the given cybersecurity incident is of the third threat category (153), the processor 401 can be configured to determine what process has caused the first cybersecurity incident (122), and whether the host operating system, where the first cybersecurity incident has occurred or detected, is a server operating system (123).

If the processor 401 has determined that the given cybersecurity incident is caused by a system process and the host operating system is a server one, at the host level, the processor 401 can further be configured to determine the respective automated incident response as being copying the content of the random-access memory (memory dump) (144), according to step 140 of the method 100 described above. For example, the content of the random-access memory can be copied, if less than an $N_2$ predetermined threshold number of incident responses have been executed for a predetermined time. If the number of incident responses is greater than or equal to the $N_2$ predetermined threshold number over the predetermined time, the processor 401 can be configured to cease to analyze the incident data associated with the first cybersecurity incident without determining the respective automated incident response thereto.

However, in other non-limiting embodiment of the present technology, the processor 401 has determined that the first cybersecurity incident is caused by a non-system process and the host operating system is a server one, the processor 401 can be configured to determine, at the host level, the respective automated incident response as copying the content of the random-access memory (145) and stopping the malicious process (146). The processor 401 can be configured to cause copying the content of the random-access memory (memory dump) and stopping the malicious process, if less than an $N_3$ predetermined threshold number of responses have been done for a predetermined time; otherwise, the processor 401 can be configured to cease to further analyze the incident data associated with the first cybersecurity incident without determining the respective automated incident response thereto.

If the host operating system is not a server one, the processor 401 can be configured to determine, at the host level, the respective automated incident response as being isolating the host where the first cybersecurity incident has occurred from the network of the computer system (147), in accordance with the step 140 of the method 100 described above. More specifically, the host is isolated from the network, if less than an $N_4$ predetermined threshold number of hosts have been isolated for a predetermined time, otherwise, the processor 401 can be configured to stop analyzing the incident data without determining the respective automated incident response.

Thus, the processor 401 can be configured to determine the respective automated incident response to the first cybersecurity incident in accordance with method 100 described above.

A Second Example of Determining the Automated Incident Response

Let it be assumed that an intruder has gained remote access to an operating system of one of hosts of a given computer system using a privileged user account, for example, a domain administrator user account. The intruder starts to collect data on the given computer system and network environment associated therewith, for which the intruder may use, for example, a command line interpreter cmd.exe, being a part of a Windows operating system. For example, using the command line interpreter, the intruder may cause execution of the following commands at the host:

```
cmd.exe /c hostname
cmd.exe /c whom
cmd.exe /c ver
cmd.exe /c ipconfig -all
cmd.exe /c ping www.google.com
cmd.exe /c query user
cmd.exe /c net user
cmd.exe /c net view
cmd.exe /c net view /domain
cmd.exe /c reg query "HKCU\SOFTWARE\
   Microsoft\Windows\CurrentVersion\Internet
   Settings
cmd.exe /c tasklist /svc
cmd.exe /c netstat -ano | find TCP
```

Each of these commands is itself legitimate, that is, none of them taken individually carries any cybersecurity threat. However, executing such a sequence of these legitimate commands in the operating system may be pose a second cybersecurity incident to the given computer system. When such sequence is detected, a respective rule will be triggered in at least one of the external computer systems continuously searching for cybersecurity threats. In response, the external computer system generates incident data of the second cybersecurity incident and further transmits the incident data to the system described above with reference to FIG. 1 implementing the method 100.

Thus, the processor 401 can be configured to receive the incident data of the second cybersecurity incident including the following parameters:

Threat Severity (Severity): high;

Threat Category (Category, what namely happens): advanced persistent threat (APT); Reliability Level (Reliability): 87%;

Network segment where the host, in which the second cybersecurity incident has occurred or detected, is located: segment name;

Workgroup \ domain which it belongs to: domain name \ workgroup name;

Whose working place (position) this host is: domain administrator computer.

In accordance with step 121 in FIG. 3, the processor 401 can be configured to determine that the second cybersecurity incident has not occurred in the sandbox, and that there are no malicious files associated therewith, but the threat has not been prevented yet. Further, the processor 401 can be configured to determine that as the threat severity level is high, determining of the respective automated incident response is required.

Since the threat category of the second cybersecurity incident is "APT", to determine the respective automated incident response, the processor 401 can be configured to proceed to step 153 of the example process of FIG. 3. Since the second cybersecurity incident has occurred in the non-system process (processes of cmd.exe interpreter do not relate to system ones), and the host operating system, where the incident has occurred, is not a server one, the processor 401 can be configured to additionally check if at least the $N_4$ predetermined threshold number hosts have been isolated today (on the day of threat detection); let us assume, $N_4=5$. For example, the system has not isolated 5 hosts today yet, therefore, the processor 401 can be configured to determine the respective automated incident response as being isolating the host where the second cybersecurity incident has occurred or detected (147).

Since the second cybersecurity incident does not use any malicious files, the processor 401 cannot be configured to determine the respective automated incident response at the file level.

However, at the host level, the processor 401 can be configured to determine the respective automated incident response including: collection of necessary evidences, creation of the archive and sending it to the controlling ("external") server comprising the information required for operational research. In this case it could be information about all currently running processes, about startup tags, Prefetch files, system event logs, content of temporary directories, etc. After receiving the archive, the host will be isolated form the network of the given computer system such that the intruder taking control over the system will be unable to continue malicious activities, since the remote connection will be permanently lost.

Since malicious files are not used to cause the second cybersecurity incident, the processor 401 can be configured to skip copying the content of random-access memory and sector-based copying of nonvolatile memory in the respective automated incident response.

However, at the corporate network level, the processor can be configured to include blocking the user account, whose credentials have been compromised at the domain level, in the respective automated incident response. Besides, a report on response results will be sent to entities (such as operators or third-party cybersecurity services) in charge. Thus, the processor 401 can be configured to determine the respective automated incident response to the second cybersecurity incident in accordance with method 100 described above.

Computing Environment

Figure 4:
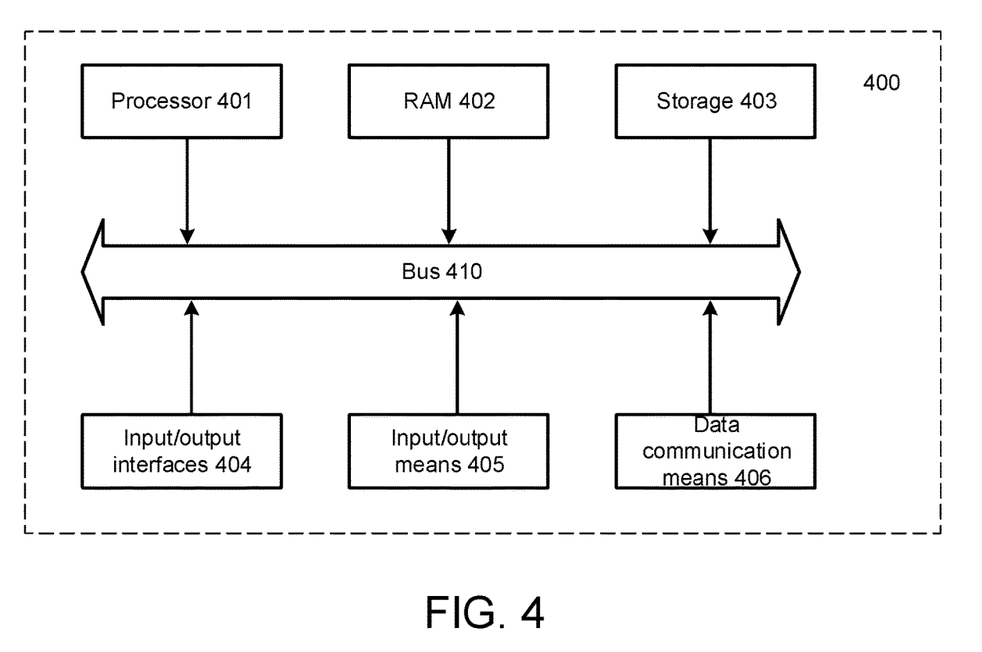
FIG. 4 depicts a schematic diagram of an example computing environment configurable for execution of present method of determining the automated incident response of FIG. 2, in accordance with certain non-limiting embodiments of the present technology.

With reference to FIG. 4, there is depicted an example functional diagram of the computing environment 400 configurable to implement certain non-limiting embodiments of the present technology including the method 100, described above.

In some non-limiting embodiments of the present technology, the computing environment 400 may include: the processor 401 comprising one or more central processing units (CPUs), at least one non-transitory computer-readable memory 402 (RAM), a storage 403, input/output interfaces 404, input/output means 405, data communication means 406.

According to some non-limiting embodiments of the present technology, the processor 401 may be configured to execute specific program instructions the computations as required for the computing environment 400 to function properly or to ensure the functioning of one or more of its components. The processor 401 may further be configured to execute specific machine-readable instructions stored in the at least one non-transitory computer-readable memory 402, for example, those causing the computing environment 400 to execute the method 100, as an example.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 403 may be configured for long-term storage of various data, e.g., the aforementioned documents with user data sets, databases with the time intervals measured for each user, user IDs, etc.

The input/output interfaces 404 may comprise various interfaces, such as at least one of USB, RS232, RJ45, LPT, COM, HDMI, PS/2, Lightning, FireWire, etc.

The input/output means 405 may include at least one of a keyboard, a joystick, a (touchscreen) display, a projector, a touchpad, a mouse, a trackball, a stylus, speakers, a microphone, and the like. A communication link between each one of the input/output means 405 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 406 may be selected based on a particular implementation of a network, to which the computing environment 400 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of a WAN, a PAN, a LAN, an Intranet, the Internet, a WLAN, a WMAN, or a GSM network, as an example.

These and other components of the computing device 400 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to provide certain examples of implementation of the non-limiting embodiments of the present technology rather than to be limiting. The scope of the present technology is therefore intended to be limited solely by the scope of the appended claims.

The invention claimed is:

1. A computer-implemented method of determining a response to a cybersecurity incident in a given computer system, the method comprising:
receiving incident data of at least one incident targeting the given computer system,
the incident data comprising: an incident category of the at least one incident, a threat severity of the at least one incident, one of a name and an address of a host of the given computer system where the at least one incident has been detected, and a detection confidence level associated with the at least one incident,
the detection confidence level being indicative of whether the at least one incidence is indicative of an actual cybersecurity threat or is a false-positive response of the given computer system;
analyzing the incident data of the at least one incident to: (i) determine whether the at least one incident was previously detected in the given computer system; (ii) comparing the detection confidence level associated with the at least one incident to a predetermined confidence level threshold; and (iii) determine whether a cybersecurity threat associated with the at least one incident has already been prevented in the given computer system;
in response to: (i) determining that the cybersecurity threat associated with the at least one incident has not been prevented yet in the given computer system; and (ii) the threat severity of the at least one incident exceeding a predetermined threat severity threshold, determining, based on the incident category, one or more responses to the at least one incident for preventing cybersecurity threat associated with the at least one incident in the given computer system; and
in response to at least one selected from the group consisting of: (i) determining that the cybersecurity threat associated the at least one incident has already been prevented in the given computer system, and (ii) the detection confidence being below the predetermined confidence level threshold, aborting further analyzing the incident data without determining the one or more responses to the at least one incident.

2. The method of claim 1, wherein the incident category comprises at least one of three predetermined incident categories.

3. The method of claim 2, wherein, if the incident category of the at least one incident is a first predetermined incident category, the one or more responses to the at least one incident comprises ending a malicious process associated with the at least one incident and isolating the host where the at least one incident has been detected.

4. The method of claim 2, wherein, if the incident category of the at least one incident is a second predetermined incident category, the analyzing includes determining a user account under which the at least one incident has been detected, and if the user account is not a privileged user account, the privileged account enabling one of installation and modification of one of an information system and a device in the given computer system, the one or more responses to the at least one incident comprises blocking the user account.

5. The method of claim 4, wherein, if the user account is the privileged user account, in response to the detection confidence level being below the predetermined confidence level threshold, the one or more responses comprises blocking the user account.

6. The method of claim 5, wherein the blocking the user account, being the privileged user account, is executed if a number of blocked privileged user accounts for a predetermined time is less than a threshold number of privileged user accounts.

7. The method of claim 2, wherein, if the incident category of the at least one incident is a third predetermined incident category, the analyzing includes determining a process having caused the at least one incident, and determining whether a host operating system of the host where the at least one incident has been detected is a server operating system.

8. The method of claim 7, wherein, if the at least one incident has been caused by a system process and the host operating system is a server operating system, the one or more responses to the at least one incident comprises coping a content of a random-access memory of the host.

9. The method of claim 8, wherein the copying the content of the random-access memory is executed if less than a threshold number of responses have been done for a predetermined time.

10. The method of claim 7, wherein, if the at least one incident has been caused by a non-system process and the host operating system is a server operating system, the one or more responses to the at least one incident comprises coping the content of the random-access memory of the host and ending the non-system process.

11. The method of claim 10, wherein the copying the content of the random-access memory and ending the non-system process are executed if less than a threshold number of responses have been done for a predetermined time.

12. The method of claim 7, wherein, if the host operating system is not a server operating system, the one or more responses to the at least one incident comprises isolating, within the given computer system, the host where the at least one incident has been detected.

13. The method of claim 12, wherein the isolating the host is executed if less than a threshold number of hosts have been isolated for a predetermined time.

14. The method of claim 1, wherein the one or more responses are for the responding to the at least one incident in the given computer system at one of a file level, a host level and a network level.

15. The method of claim 14, wherein the responding at the file level comprises at least one of:
blocking at least one malicious file and quarantining it;
sending at least one malicious file to an isolated environment for analysis;
searching for at least other one malicious file associated with the at least one malicious file on at least one host, and deleting the at least other one malicious file; and
ending a malicious process.

16. The method of claim 14, wherein the responding at the host level comprises at least one of:
collecting incident information of the at least one incident at the host;
copying a content of a random-access memory of the host;
sector-based copying of a nonvolatile memory of the host;
isolating the host from a network of the given computer system; and
blocking execution of any applications except for original programs developed by a manufacturer of a host operating system of the host.

17. The method of claim 16, wherein the incident information comprises at least one of: data on programs automatically loaded at starting the host operating system, Prefetch files, running processes, system event logs, content of temporary directories.

18. The method of claim 14, wherein the responding at the network level comprises at least one of:
blocking a user account;
running incident handling script files; and
sending a report.

19. A system for determining a response to a cybersecurity incident in a given computer system, the system comprising:
at least one processor communicatively coupled to a given computer system, and
at least one non-transitory computer-readable memory storing instructions, which, when executed by the at least one processor, cause the system to:
receive incident data of at least one incident targeting the given computer system,
the incident data comprising: an incident category of the at least one incident, a threat severity of the at least one incident, one of a name and an address of a host of the given computer system where the at least one incident has been detected, and a detection confidence level associated with the at least one incident,
the detection confidence level being indicative of whether the at least one incidence is indicative of an actual cybersecurity threat or is a false-positive response of the given computer system;
analyze the incident data of the at least one incident to:
(i) determine whether the at least one incident was previously detected in the given computer system;
(ii) comparing the detection confidence level associated with the at least one incident to a predetermined confidence level threshold; and (iii) determine whether a cybersecurity threat associated with the at least one incident has already been prevented in the given computer system;
in response to: (i) determining that the cybersecurity threat associated with the at least one incident has not been prevented yet in the given computer system; and (ii) the threat severity of the at least one incident exceeding a predetermined threat severity threshold, determine, based on the incident category, one or more responses to the at least one incident for preventing cybersecurity threat associated with the at least one incident in the given computer system; and
in response to at least one selected from the group consisting of: (i) determining that the cybersecurity threat associated the at least one incident has already been prevented in the given computer system, and (ii) the detection confidence being below the predetermined confidence level threshold, abort further analyzing the incident data without determining the one or more responses to the at least one incident.

* * * * *